United States Patent
Bertsch et al.

(10) Patent No.: US 10,565,358 B1
(45) Date of Patent: Feb. 18, 2020

(54) IMAGE CHAIN OF TITLE MANAGEMENT

(71) Applicant: Eight Plus Ventures, LLC, Santa Monica, CA (US)

(72) Inventors: Christoph Bertsch, Pacific Palisades, CA (US); Rodney Lake, Santa Monica, CA (US); Douglas Sturgeon, Half Moon Bay, CA (US); Anthony Sziklai, Oak Park, CA (US)

(73) Assignee: Eight Plus Ventures, LLC, Santa Monica, CA (US)

( * ) Notice: Subject to any disclaimer, the term of this patent is extended or adjusted under 35 U.S.C. 154(b) by 0 days.

(21) Appl. No.: 16/571,901

(22) Filed: Sep. 16, 2019

(51) Int. Cl.
*G06F 21/16* (2013.01)
*H04L 9/06* (2006.01)
*G06F 21/60* (2013.01)
*H04L 29/06* (2006.01)
*G06T 7/70* (2017.01)
*G06K 9/62* (2006.01)

(52) U.S. Cl.
CPC ............ *G06F 21/16* (2013.01); *G06F 21/602* (2013.01); *G06K 9/6267* (2013.01); *G06T 7/70* (2017.01); *H04L 9/0637* (2013.01); *H04L 9/0643* (2013.01); *H04L 63/0428* (2013.01); *G06F 2221/0733* (2013.01); *H04L 2209/38* (2013.01)

(58) Field of Classification Search
CPC .................. G06F 21/16; G06F 21/602; G06F 2221/0733; G06K 9/6267; G06T 7/70; H04L 2209/38; H04L 63/0428; H04L 9/0637; H04L 9/0643
See application file for complete search history.

(56) References Cited

U.S. PATENT DOCUMENTS

| | | |
|---|---|---|
| 6,657,702 B1 | 12/2003 | Chui |
| 7,209,571 B2 | 4/2007 | Davis et al. |
| 7,668,869 B2 | 2/2010 | Weinberger |
| 8,494,231 B2 | 7/2013 | Folta |
| 9,690,967 B1 | 6/2017 | Brundage et al. |
| 10,142,381 B2 | 11/2018 | Nathan |

(Continued)

OTHER PUBLICATIONS

D. Bhowmik and T. Feng, "The multimedia blockchain: A distributed and tamper-proof media transaction framework," 2017 22nd International Conference on Digital Signal Processing (DSP), London, 2017, pp. 1-5 (IEEE Nov. 7, 2017) (Year: 2017).*

(Continued)

*Primary Examiner* — Theodore C Parsons
(74) *Attorney, Agent, or Firm* — SoCal IP Law Group LLP; Steven C. Sereboff; Nikki M. Dossman

(57) ABSTRACT

In an apparatus and method, image metadata is assigned to a master image file including an image from a base work, the image metadata including an identification of the base work and provenance of the base work. Objects in the image are detected and recognized. Object metadata, including recognition of the object, is assigned to the master image file. A cryptographic hash of, altogether, the image, the image metadata, and the object metadata is generated. An image product from the master image file for transfer is generated. A data packet structure is written to a node of a transaction processing network, wherein the data packet structure includes the cryptographic hash, and transferor and transferee identification for a transfer of the image product.

20 Claims, 5 Drawing Sheets

FIG. 3

(56) References Cited

U.S. PATENT DOCUMENTS

| | | |
|---|---|---|
| 10,256,829 B1 | 4/2019 | Bertsch |
| 10,325,156 B1 | 6/2019 | Bertsch |
| 10,361,866 B1 * | 7/2019 | McGregor ............ H04L 9/0637 |
| 2002/0012445 A1 | 1/2002 | Perry |
| 2002/0146123 A1 | 10/2002 | Tian et al. |
| 2004/0153649 A1 | 8/2004 | Rohads et al. |
| 2004/0201751 A1 | 10/2004 | Bell |
| 2005/0010792 A1 | 1/2005 | Carpentier et al. |
| 2005/0069171 A1 | 3/2005 | Rhoads et al. |
| 2006/0103736 A1 | 5/2006 | Obrador |
| 2006/0130118 A1 | 5/2006 | Damm |
| 2006/0251338 A1 * | 11/2006 | Gokturk ............ G06K 9/00375 382/305 |
| 2007/0061895 A1 | 3/2007 | Ceraolo et al. |
| 2007/0165253 A1 | 7/2007 | Usui |
| 2008/0049971 A1 | 2/2008 | Ramos et al. |
| 2008/0127270 A1 | 5/2008 | Shipman et al. |
| 2008/0228733 A1 | 9/2008 | Davis et al. |
| 2008/0243898 A1 | 10/2008 | Gormish |
| 2009/0141932 A1 | 6/2009 | Jones |
| 2010/0059380 A1 | 3/2010 | Rohads et al. |
| 2010/0080471 A1 | 4/2010 | Haas et al. |
| 2010/0309226 A1 | 12/2010 | Quack |
| 2012/0106806 A1 | 5/2012 | Folta et al. |
| 2013/0003126 A1 | 1/2013 | Van Osdol et al. |
| 2014/0049653 A1 | 2/2014 | Leonard et al. |
| 2014/0214885 A1 | 7/2014 | Park |
| 2014/0331137 A1 | 11/2014 | McKoen |
| 2015/0100578 A1 | 4/2015 | Rosen et al. |
| 2015/0172787 A1 | 6/2015 | Geramifard |
| 2015/0178786 A1 | 6/2015 | Claessens |
| 2016/0285631 A1 | 9/2016 | Deleeuw |
| 2016/0342937 A1 | 11/2016 | Kerrick |
| 2016/0379330 A1 | 12/2016 | Powers |
| 2017/0140346 A1 | 5/2017 | Whitehouse |
| 2017/0243179 A1 | 8/2017 | Dehaeck |
| 2018/0046889 A1 | 2/2018 | Kapinos et al. |
| 2018/0121635 A1 | 5/2018 | Tormasov et al. |
| 2018/0136633 A1 | 5/2018 | Small |
| 2018/0253567 A1 | 9/2018 | Gonzalez-Banos et al. |
| 2018/0257306 A1 | 9/2018 | Mattingly et al. |
| 2018/0261307 A1 | 9/2018 | Couse |
| 2018/0278423 A1 | 9/2018 | Bianzino |
| 2019/0045207 A1 | 2/2019 | Chen |

OTHER PUBLICATIONS

M. Kerr, F. Han and R. v. Schyndel, "A Blockchain Implementation for the Cataloguing of CCTV Video Evidence," 2018 15th IEEE International Conference on Advanced Video and Signal Based Surveillance (AVSS), Auckland, New Zealand, 2018, pp. 1-6 (IEEE Nov. 30, 2018) (Year: 2018).*

Cryptoart, "Cryptoart is like a piggy bank. Each art piece physically stores Bitcoin. Each art piece also includes an easy 3-step guide to understanding Bitcoin", online article, https://cryptoart.com/how-cryptoart-works/, last accessed Jul. 25, 2018, 3 pages.

R.A.R.E., A new age platform for collecting unique, scarce digital art, cultivating the next generation of artists and collectors, https://www.rareart.io/#How-RARE-Works, last accessed Jul. 25, 2018, 6 pages.

Ando et al. image Recognition Based Digital Watermarking Technology for Item Retrieval in Convenience Stores, journal, Feature Articles: Creating New Services with corevo-NTT Group's Artificial IntIligence Technology, vol. 15 No. 3, published Aug. 2017, 6 pages.

World Intellectual Property Organization, International Search Report and Written Opinion, for International Application No. PCT/US2019/043671, dated Sep. 4, 2019, 3 total pages.

World Intellectual Property Organization, International Search Report and Written Opinion, for International Application No. PCT/US2019/043676, dated Sep. 9, 2019, 8 total pages.

World Intellectual Property Organization, International Search Report and Written Opinion, for International Application No. PCT/US2019/035869, dated Jul. 17, 2019, 10 total pages.

* cited by examiner

IMAGE CHAIN OF TITLE MANAGEMENT

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to digital image management.

Description of the Related Art

A movie is a collection of still images shown one after the other in quick succession. When the images are viewed in quick succession (approximately 24 images per second), the human brain interprets the images as a motion picture or movie. Movies made in non-digital (e.g., photographic film) media can be converted to digital format, and the converted movies as well as movies originally made in digital format can have individual images extracted from the master digital media file. Artificial intelligence technology can be applied to the content of the master digital media file to modify individual images and/or associated data, and similarly applied to individual images that originated as digital photographs, photographic films, or other works. The images and associated data can be assembled into a new derivative digital work. However, digital works are easily shared and can be exploited by others. The owners of the original images have an interest in protecting their copyrights in these images from infringement and unauthorized or criminal use.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Figure 1:
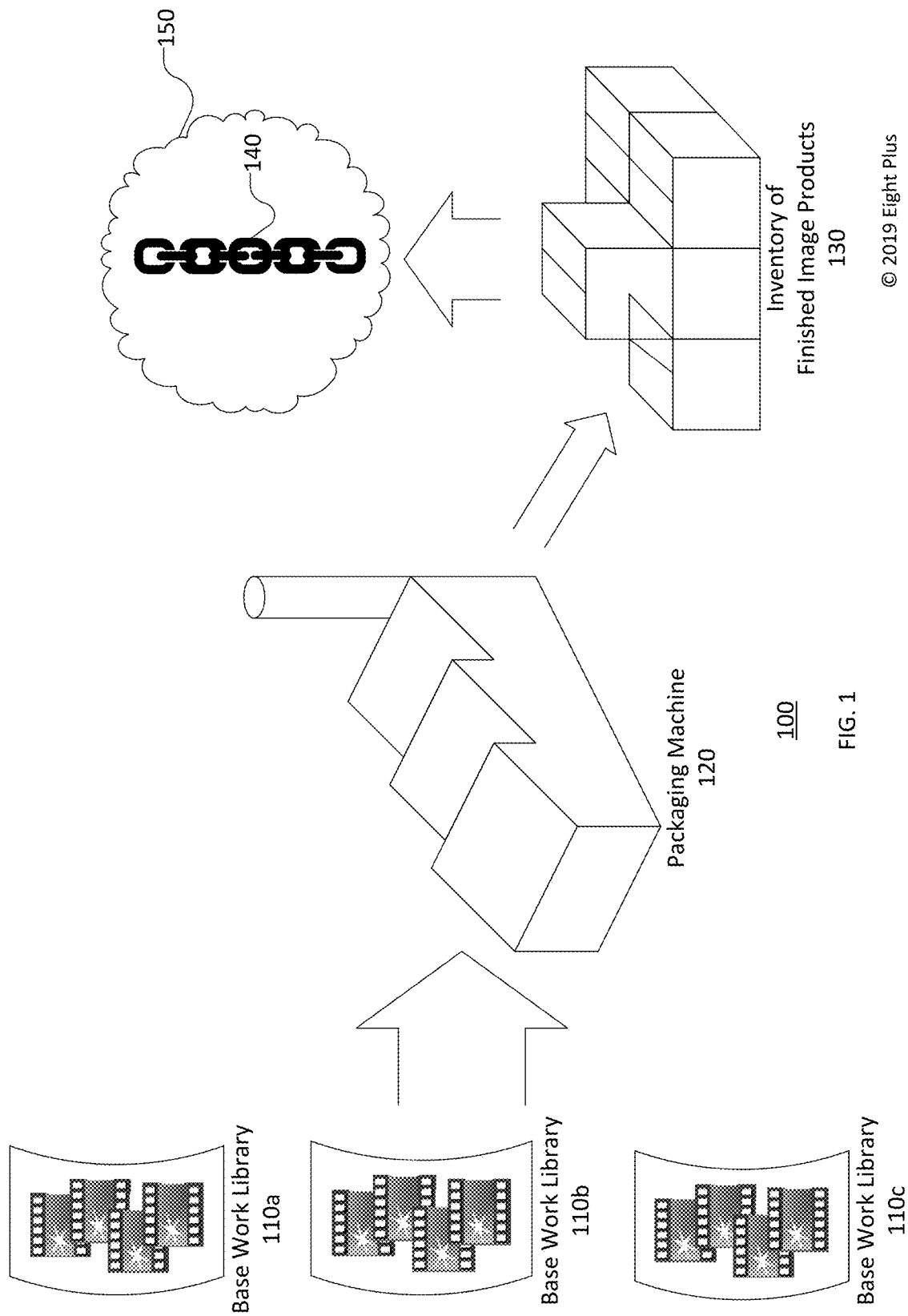
FIG. 1 is a block diagram of a system for production of image inventories.

Referring now to FIG. 1, there is shown a block diagram of a system 100 for production of image inventories. The system 100 includes one or more film libraries 110*a*, 110*b*, 110*c*, a slicing and packaging machine 120, an inventory of finished image products 130, and transaction processing nodes 140.

The base work libraries 110*a*, 110*b*, 110*c* each include a collection of base works, where a base work is one or more whole movies, videos, and/or movie trailers, and/or portions thereof (e.g., clips), each of which is a sequence of frames having a respective still image, a single frame, i.e., a still image, or also may be a picture, painting, photograph, drawing, or other single image work. The base works may be in analog or digital format, and each base work library 110*a*, 110*b*, 110*c* may be exclusive to a particular form or format of base work. Some base work libraries may have base works in assorted forms and/or formats, related or unrelated. The base work may have various objects, such as people, animals, goods or text in the image. A given frame of a movie may include audio and subtitles.

Figure 2:
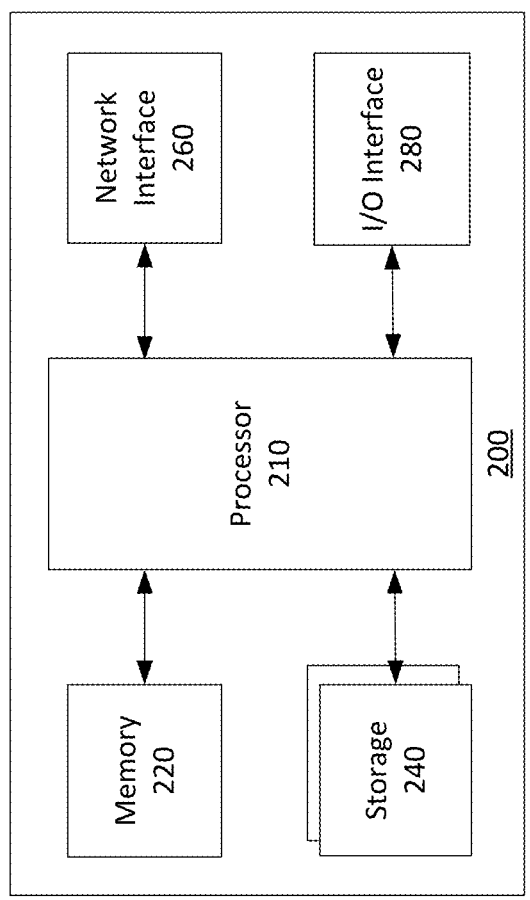
FIG. 2 is a block diagram of a computing device.
Figure 4:
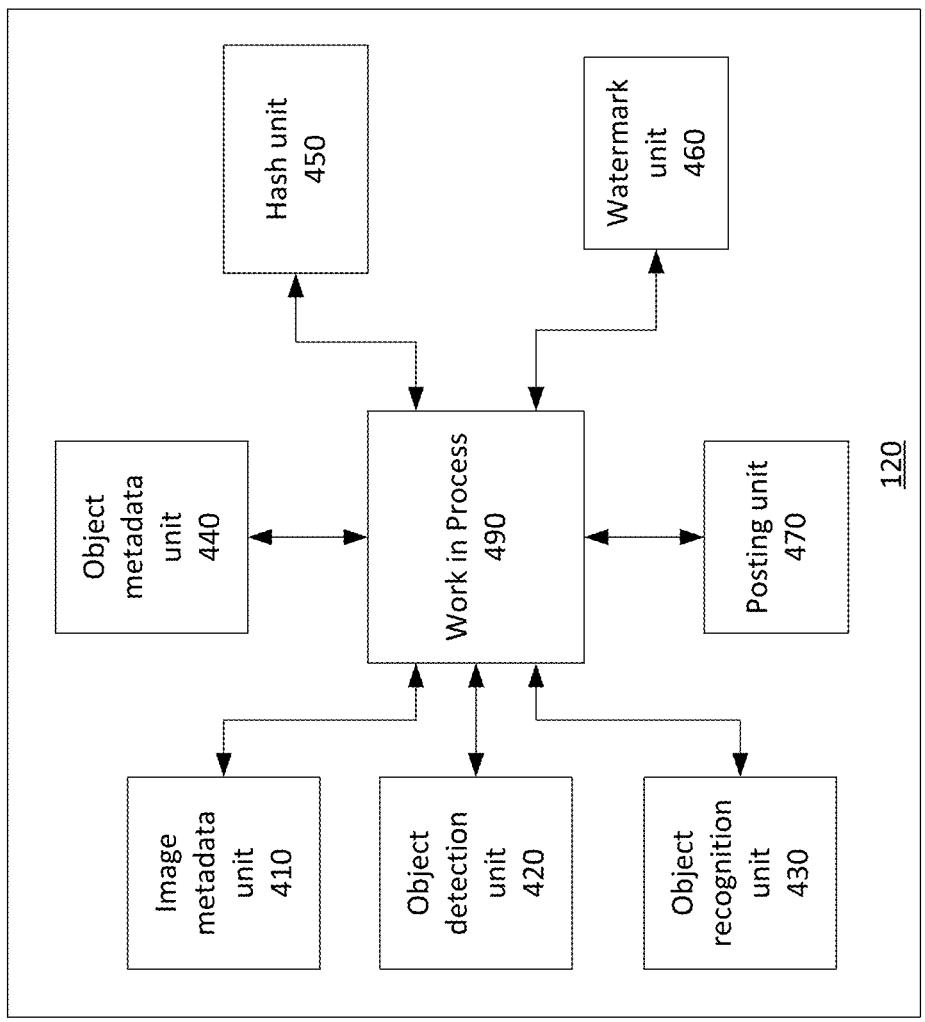
FIG. 4 is a block diagram of a packaging machine.

The packaging machine 120 produces the inventory of finished image products 130 and moves them into the transaction processing nodes 140. The packaging machine 120 may be a computer system, such as shown in FIG. 2, including one or more non-volatile machine-readable media storing a program having instructions which when executed by a processor will cause the processor to produce the inventory of finished image products 130. As shown in FIG. 4, the packaging machine 120 may include an image metadata unit 410, an object detection unit 420, an object recognition unit 430, an object metadata unit 440, a hash unit 450, a watermark unit 460, a posting unit 470. These units 410, 420, 430, 440, 450, 460, 470 interact with a work in process subsystem 490, which may be storage 240 (FIG. 2). The posting unit 470 may effectuate its work through I/O interface 280 (FIG. 2).

Artificial intelligence may be incorporated into or used by the image metadata unit 410, the object detection unit 420, the object recognition unit 430 and/or the object metadata unit 440. Accordingly, these units 410, 420, 430, 440 may be trained to perform the corresponding work prior to going into production. These units 410, 420, 430, 440 may employ quality assurance, such as use of human checks on samples of the production output, which may be used as feedback for refinement of the training.

Each finished image product in the inventory 130 is a chattel good, capable of transfer on an individual basis. The transaction processing nodes 140 may be in an information technology cloud 150, such as cloud storage. The transaction processing nodes may be in a blockchain.

Figure 3:
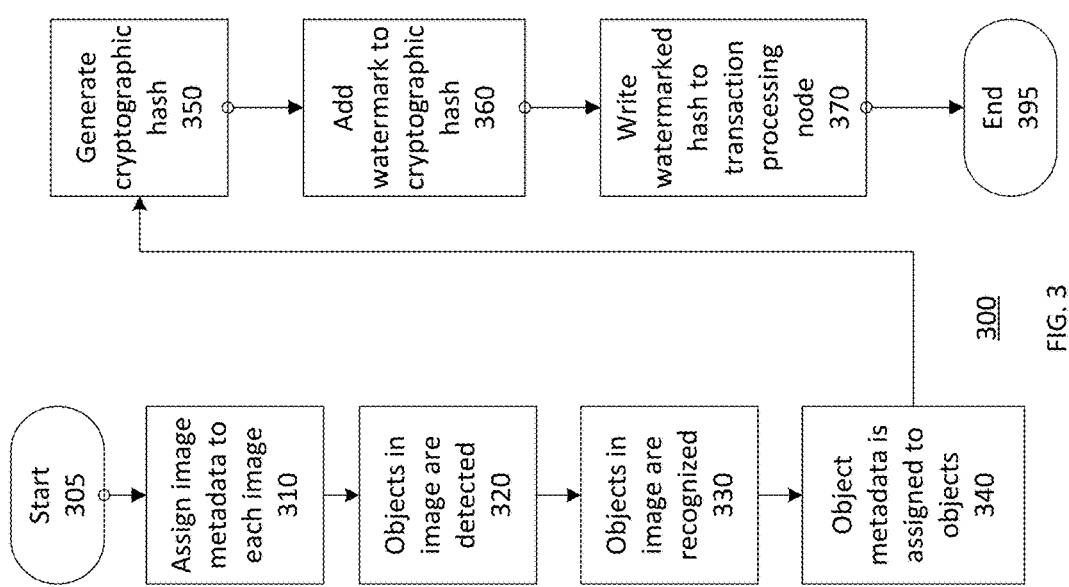
FIG. 3 is a flowchart of a process for production of image inventories.

Referring now to FIG. 3, there is shown a flowchart 300 of a process for production of image products in the image inventories. The process 300 may be performed by the packaging machine 120 of FIG. 1 and FIG. 4, having as inputs the base work libraries 110*a*, 110*b*, 110*c*, or a single image work, and manufacturing the inventory of finished image products 130. The flow chart 300 has both a start 305 and an end 395, but the process is cyclical in nature.

After starting 305, the process may include some preprocessing. This preprocessing may include extraction of base works from the base work libraries into the work in process subsystem 490, and extraction of frames from a base work. The base work may be on an analog physical medium such as celluloid film or other physical medium, such as photographic film, paper, canvas, stucco, plaster, concrete, brick, etc., and preprocessing may include scanning the analog medium into a digital file. If the base work is in analog form it may be converted to digital form. Preprocessing results in the base work, in digital form, being stored in the work in process subsystem 490.

During preprocessing, a human operator may select which frames or images should be included or excluded from further processing by the packaging machine. Image selection criteria may include metadata as described below. The operator may be provided with options for frame selection, such as actors. For example, if the film Butch Cassidy and the Sundance Kid was being preprocessed, the operator could choose to process only the frames having Butch Cassidy (played by Paul Newman), or only the frames showing his face.

Next, metadata is assigned to each frame or image of the base work (step 310) to create a master image file. This may be performed by the image metadata unit 410 and the object metadata unit 440. The image metadata may include an identification of the work, provenance of the work, an identification of the processor, and an identification of the frame within the base work. The image metadata may include: colors in the image; tags previously assigned to the image that describe the image; and geographic location represented in the image. The provenance of the work may include: the identity of the packaging machine; the geographic location and timestamp where the image was originally produced or subsequently processed; names or other identification of the people, equipment and firms which did the production and processing; language and subtitles; details of how the production and processing were performed; and details of errors and errata from the production and processing. Image metadata for a given image may include a sequence of images from immediate prior and or subsequent frames, or thumbnails of them, such as from a video or collection of still images. The image metadata for each image may be stored in a single file, with a CSV, XML or JSON format. The image metadata from plural frames or images may be stored in a database, and the database may also include the correlated images.

Image metadata for frames of video may include: frame number in the overall frame count for the movie or segment or video or video clip or trailer being processed; frame number in a given segment or fragment of the whole base work; frame number in its relative position in a given segment or fragment of the base work; license attributes such as whether electronic reproduction and/or hardcopy printing are permitted; genre; category; title of the base work; title of the scene; starting time code; ending time code; duration; frame count; producer; director; studio.

Metadata for frames of still images may include: title or identify of the collection or sub-collection of which the image is a part; artist; subject; category; album; session; sequence; session index; original medium; sequence index; camera used; number of photographs in the album, session and/or sequence.

Next, objects in each frame or image are detected (step 320). This may be performed by the object detection unit 420. The object detection step may include differentiation from a series of frames, for example using a Kalman filter on the images to recognize objects in motion.

Next, the detected objects are recognized (step 330). This may be performed by the object recognition unit 430. These objects may be recognizable generically or with varying specificity. For example, an object may be recognized generically as a person, or as a specific type of person (e.g., adult, child, male, female, star actor, extra), or as a specific person (e.g., Mae West or John F. Kennedy). Recognition of audio objects may include speech to text conversion. Frames may include text objects, such as signs or labels in an image.

Next, object metadata is assigned to the recognized objects (step 340). This may be performed by the object metadata unit 440. This object metadata may include the location in the frame of the object and recognition of the object (i.e., identification of what the object is). The object metadata may include an image of the object (e.g., an actor). The object metadata of a person may include the actor's name. The object metadata for audio objects may include spoken lines and sounds.

The object metadata may link objects from within frames or across frames. For example, audio may be linked to the object in the image which produces the audio. In this way lines of dialogue may be linked to the actor speaking the lines. In this way, in Gone with the Wind, Rhett Butler (played by Clark Gable) may be linked to the line, "Frankly, my dear, I don't give a damn." Likewise, recitations of "May the Force be with you" in a Star Wars film may be linked to each actor reciting this line. The sound of a gunshot may be linked to the image of the gun, or to a person struck, such as in the movie The Matrix, when Neo (played by Keanu Reeves) is shot.

Additional image or object metadata may include whether it is a hero shot, where a famous actor appears in the frame; lead actors, where lead actors who may not be hero level actors, but are still the lead actors for the movie, appear in the frame; other actors that are not lead actors appear in the frame; famous locations, such as Monument Valley, Ariz., appearing in the frame; popular or famous objects, such as the Millennium Falcon, appearing in the frame; desired color composition appearing in the image; quality of preservation or original source media, as whether it deteriorated or is damaged; and pre-existing value of adjacent segments or frames.

Next, for each master image file, a cryptographic hash is generated of the image, the image metadata, and the object metadata (step 350). The cryptographic hash can be generated of the image, the image metadata, and the object data altogether. This may be performed by the hash unit 450, which encrypts information items that uniquely identify an image into a hash value that uniquely identifies the image and information items about the image. Thus, if even a single digital bit is changed in the files of the image and information items about the image that are input into the cryptographic hashing algorithm, the resulting hash value will be completely different from the hash value before the digital bit was changed. The hash unit 450 may produce a hash value from the authenticated representation of the image file along with the image and object metadata. This hash value is more efficient and technologically superior to prior art index prints which aim to confirm that an individual print is part of a collection of prints shown in the index print.

The cryptographic hashing of the image with the metadata is performed to be able to objectively and transparently confirm authenticity of the image and the metadata into the future. This allows reliable chain of title and chain of custody of the image product and can support a reliable market for the image product. For example, the cryptographic hash associated with the image product can be compared to the cryptographic hash in the transaction processing network, such that a match indicates an authentic image product and no match indicates an inauthentic image product.

Next a watermark may be added to the hash (step 360) to protect the linkage of the image file with its hashed value from malicious tampering. This may be performed by the watermark unit 460. The watermarking unit 460 packages the hash value with the corresponding frame.

Next, the watermarked cryptographic hash is written to a node of a transaction processing network (step 370). This may be performed by the posting unit 470 by generating a transaction to register the watermarked hash along with its record provenance into a blockchain. Writing to the node may occur under control of a smart contract. The hash values provided by the hash unit 410, or the packages from the watermarking unit 460, are recorded by the posting unit 470 into the transaction processing nodes 140, which may be in a secure transaction processing network, distributed ledger or blockchain, or other transaction processing environment. The distributed ledger may be an immutable distributed ledger.

Image products can then be manufactured from the master image file. A derivative image product can be a digital image based on the image of the master image file, such as a digital image of a certain definition (e.g., standard definition or high definition), a thumb nail, a cropped portion of the digital image, a particular frame of a video, etc. An image product can also be a physical print based on the image of the master image file, such as a print on photographic film, canvas, wood, metal, apparel or any other suitable surface for supporting an image, e.g., via printing, embossing, burning, engraving, etc.

The transaction processing nodes may support queries. Thus, an individual who might want to purchase an image product could make a query to confirm the authenticity of the image. In another example, an image viewer or processor may query whether the image is authentic prior to allowing access to the image for viewing or editing.

With the development of transactions written to the blockchain and other similar authentication technologies, there exists an opportunity for bad actors to utilize these transactions for nefarious purposes. One example of a nefarious purpose would be money laundering. The money laundering activity using the blockchain technology can be based on Bitcoin or similar blockchain-based cryptocurrency. One limitation of using Bitcoin or similar cryptocurrency technology for money laundering across international borders is the risk of customs agents confiscating the digital wallet that contains the bitcoin or other cryptocurrency. During inspection of electronic devices for money laundering, a cryptocurrency application or a thumb drive containing the cryptocurrency wallet can be identified. Otherwise, if the device owner refuses to open a cryptocurrency wallet for inspection, the device can be confiscated. In either case, device owner is relieved of the cryptocurrency.

In response to criminal desire to avoid detection of money laundering when crossing international borders, alternative money laundering methodologies can use authenticatable items of value other than cryptocurrency. One alternative money laundering methodology is illicit off-the-books funds transfer network/mechanism (FTM). In an FTM, multiple funds transfer entities operate in a loose network where funds deposited with one FTM member are accessible from another FTM member. The FTM avoids the money laundering complications of carrying physical cash bills or a digital wallet that must be opened at the point of customs inspection.

Presently, certain technology, such as the system for production of image products described above (see also U.S. Pat. Nos. 10,256,829; 10,289,915; 10,325,156; and 10,296,729) can be used by bad actors to improve the functionality of an FTM for money laundering purposes through the creation of a digital file that, on its face is innocuous, but when presented to an FTM member, confirms the identity and amount of the funds due to the person presenting the digital file.

For example, Individual A visits FTM Member X and deposits $100,000 with Member X. Member X then gives Individual A a thumb drive with a collection of digital images representing frames from a selection of movies that have been authenticated pursuant to the process involving cryptographic hashes outlined above. The authenticated digital images are protected by digital watermarking technology to further confirm the authenticity of the particular images. To move the money, Individual A travels to another country and passes through customs with the thumb drive containing the digital images. When the customs officer asks to see the contents of the thumb drive, the customs officer will merely see images with no currency amount attached to the images, and Individual A is cleared through customs. Individual A then visits FTM Member O and presents the thumb drive containing the library of authenticated and watermarked digital images from FTM member X upon the original receipt of the $100,000. Upon confirming that the digital watermarked and authenticated images have not been tampered with, FTM member O transfers $100,000 to Individual A and the money laundering cycle is complete.

Figure 5:
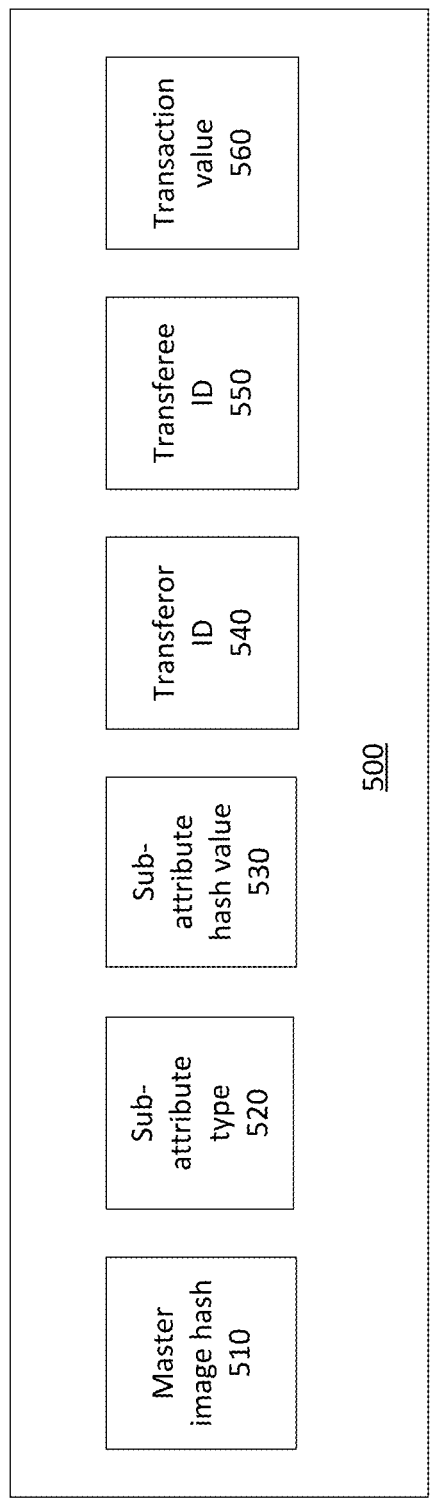
FIG. 5 is a block diagram of a data packet structure.

This type of money laundering can be deterred by tracking information about image product transfers, as shown in the data packet structure 500 of FIG. 5. Each image product can have a corresponding record created that is written to the transaction processing network in the process of creation of the authenticated digital image product from a master digital image, as described above. This image product record can also be associated with the master image file. A data packet structure 500 is appended to each image product record that is written to the transaction processing node. In the example shown in FIG. 5, the data packet structure 500 has fields including a master image hash 510, a sub-attribute type 520, a sub-attribute hash value 530, a transferor ID 540, a transferee ID 550, and a transaction value 560. The data packet structure can have fewer or more fields, or the fields can be in a different order.

Master image hash 510 is a hash of the master image file. Sub-attribute type 520 is the format type, such as a standard definition (SD) file, a high definition (HD) file, a print, etc. Sub-attribute hash value 530 is a hash of the sub-attribute type. Transferor ID 540 and transferee ID 550 are identification of the transferor and transferee of the image product, respectively, such as a tax payer identification number, a social security number, an assigned identification number, a driver's license number, a passport number, other government issued identification number, or other suitable identification number. The transferor ID 540 and transferee ID 550 optionally can be encrypted, e.g., using AES256 public-private key encryption technology or other suitable encryption technology that facilitates privacy and identity protection for the transferor and transferee. Transaction value 560 is a value of the money paid by the transferee to the transferor for the transfer of the image product. For example, the value can be recorded as Dollars, Marks, Yen, cryptocurrency, etc.

Table 1 shows an example of a data packet structure appended to a master image file for an initial recordation of the master image file. In the examples shown in Table 1, Table 2, and Table 3 below, the elements or fields are separated by commas, and the transaction value is followed by an end-of-record flag. However, the fields can be separated by any suitable notation, such as periods, semi-colons, colons, dashes, etc., or no notation, and the end-of-record flag may not be used.

TABLE 1

| master image hash | sub-attribute type | sub-attribute hash value | transferor ID | transferee ID | transaction value |
|---|---|---|---|---|---|
| ABCD | 000 | | | 789 | |

This data packet structure shows the initial recordation of an image, where ABCD is the hash value attributed to the master image file with its identifying metadata. A sub-attribute file is designated 000 because this data packet structure is for an initial recordation of the master image file and not an image product. The transferor ID field is an empty field in this example, since the image is being recorded for the first time, but an identification of the creator of the master image file (or other suitable information such as the transferee ID since this is an initial recordation) could alternatively be in the transferor ID field. The transferee ID field is 789, e.g., the transferee's tax identification number, where the transferee is the initial owner of the master image file. The initial recordation has no transaction value in this example. In other examples, transaction value could include a value paid to or from the creator of the master image file or the owner of the base work.

Table 2 shows an example of a data packet structure appended to a record of an image product for a recordation of the sale of the authenticated copy of the image from Table 1.

TABLE 2

| master image hash | sub-attribute type | sub-attribute hash value | transferor ID | transferee ID | transaction value |
|---|---|---|---|---|---|
| ABCD | 001 | 123 | 789 | 456 | $20 |

This data packet structure shows a sale of the image product that is an SD file copy of an image of the master image file with the hash value, ABCD, attributed to the master image file with its identifying metadata. The sub-attribute type, 001, is a designation that the image product is an SD resolution copy of the image. The sub-attribute hash value 123 is the hash value of the SD resolution copy of the image whose sale is being recorded. The transferor ID is now 789, because the transferee of Table 1, 789, is conveying the image product (i.e., the SD resolution copy of the image) to a different entity. The transferee ID (i.e., the entity receiving the SD resolution copy of the image) is 456. The transaction value is $20 in this example.

Table 3 shows an example of a data packet structure appended to a record of an image product for a recordation of a resale of a previously recorded and sold authenticated copy of the image of Tables 1 and 2.

TABLE 3

| master image hash | sub-attribute type | sub-attribute hash value | transferor ID | transferee ID | transaction value |
|---|---|---|---|---|---|
| ABCD | 001 | 123 | 456 | 101112 | $25 |

This data packet structure shows a resale of the SD file copy of the image product of an image of the master image file with the hash value, ABCD, attributed to the master image file with its identifying metadata. The sub-attribute type, 001, is a designation of an SD resolution copy of the master image file. The sub-attribute hash value 123 is the hash value of the SD resolution copy of the image whose resale is being recorded. The transferor ID is now 456, because the transferee of Table 2 is conveying the image product (i.e., the SD resolution copy of the image) to a different entity. The transferee ID (i.e., the entity receiving the SD resolution copy of the image) is 101112. The transaction value is $25 in this example.

Each master image file has a record (e.g., ledger) of all copies of the image product (e.g., an SD image, an HD image, a physical print image, etc.) made from the master image file. Value trends in image products of the master image file (e.g., rising, falling, or flat) can be identified for future purchases, and trend data can be used as input into valuation of the master image file. Sub-attribute types can be used to identify different waterfall royalty elements (e.g., physical prints have a lower percentage royalty than SD files, etc.).

Having this data packet structure appended to each record that is written to the transaction processing node (e.g., blockchain) can prevent FTM-like money laundering in which the authenticated images are used as vehicles to facilitate the identity and the amount being laundered. The image products must have transferor and transferee identification numbers for transferor and transferee, respectively, recorded at the time the image product is created. When Individual A, as introduced above, presents the thumb drive with the image product to the customs officer, the customs officer is directed to a website for authentication of the Tax ID information upon opening of the image product file. If Individual A cannot provide the transferee ID information or the private key to decrypt the encrypted transferee ID information, the thumb drive can be confiscated, and the money laundering attempt will fail.

FIG. 2 is a block diagram of a computing device 200. A computing device as used herein refers to any device with a processor, memory and a storage device that may execute instructions including, but not limited to, personal computers and server computers. These computing devices may run an operating system, including variations of the Linux, Microsoft Windows, and Apple Mac operating systems.

The computing device 200 may be representative of the slicing and packaging machine 120 (FIG. 1). The computing device 200 may include software and/or hardware for providing functionality and features described herein. The computing device 200 may therefore include one or more of: logic arrays, memories, analog circuits, digital circuits, software, firmware and processors. The hardware and firmware components of the computing device 200 may include various specialized units, circuits, software and interfaces for providing the functionality and features described herein. For example, a global positioning system (GPS) receiver or similar hardware may provide location-based services.

The computing device 200 has a processor 210 coupled to a memory 220, storage 240, a network interface 260 and an I/O interface 280. The processor 210 may be or include one or more microprocessors, field programmable gate arrays (FPGAs), application specific integrated circuits (ASICs), programmable logic devices (PLDs) and programmable logic arrays (PLAs).

The memory 220 is a non-transitory storage medium and may be or include RAM, ROM, DRAM, SRAM and MRAM, and may include firmware, such as static data or fixed instructions, BIOS, system functions, configuration data, and other routines used during the operation of the computing device 200 and processor 210. The memory 220 also provides a storage area for data and instructions associated with applications and data handled by the processor 210. As used herein the term memory corresponds to the memory 220 and explicitly excludes transitory media such as signals or waveforms. The techniques disclosed herein may be implemented with machine readable storage media in a storage device included with or otherwise coupled or attached to a computing device. That is, the software may be stored in electronic, machine readable media.

The storage 240 provides non-volatile, bulk or long-term storage of data or instructions in the computing device 200. The storage 240 may take the form of a magnetic or solid state disk, tape, CD, DVD, or other reasonably high capacity addressable or serial storage medium. Multiple storage devices may be provided or available to the computing device 200. Some of these storage devices may be external to the computing device 200, such as network storage or cloud-based storage. In some cases, such as those involving solid state memory devices, the memory 220 and storage 240 may be a single device.

The network interface 260 includes an interface to a network such as a network that can be used to communicate calls, signals, streams, arrays, flagged samples and feedback described herein. The network interface 260 may be wired or wireless.

The I/O interface 280 interfaces the processor 210 to peripherals (not shown) such as displays, video and still cameras, microphones, keyboards and USB devices.

In some cases, storage 240 is a non-volatile machine-readable storage medium that includes all types of computer readable media, including magnetic storage media, optical storage media, and solid state storage media. It should be understood that the software can be installed in the slicing and packaging machine 120.

The technologies described herein provide various technological improvements to computer performance and efficiency. For example, the packaging machine 120 has performance enhancements over the prior art that results in more efficient production and tracking of an inventory of image products from frames of a digital video work or still images. For example, the technologies described are technological improvements over those of the past because they provide verifiable provenance of images of frames that have been extracted from a motion picture, short video such as a music video, video clip, movie trailer, or individual still photographs, and chain of title verification. It is believed that there is no mechanism in the prior art to extract individual frames or images and concurrent with the extract, provide proof of authenticity or provenance of the extracted frames and metadata about the extracted frames, and verification of the chain of title.

Some technologies described for the packaging machine 120 and/or the computing device 200 include units. Within this description, the term unit means a collection of hardware, firmware, and/or software, which may be on a larger scale than an engine. For example, a unit may contain multiple engines, some of which may perform similar functions in parallel. The terms engine and unit do not imply any physical separation or demarcation. All or portions of one or more units and/or engines may be collocated on a common card, such as a network card, or within a common FPGA, ASIC, or other circuit device.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. An apparatus comprising a non-volatile machine-readable medium storing a program having instructions which when executed by a processor will cause the processor to produce an inventory of image products from a base work, the instructions of the program for:
    assigning image metadata to a master image file including an image from the base work, the image metadata including an identification of the base work and provenance of the base work;
    detecting objects in the image;
    recognizing the objects;
    assigning object metadata, including recognition of the object, to the master image file;
    generating a cryptographic hash of, altogether, the image, the image metadata, and the object metadata;
    generating an image product from the master image file for transfer; and
    writing a data packet structure to a node of a transaction processing network, wherein the data packet structure includes the cryptographic hash, and a transferor identification and a transferee identification for a transfer of the image product.

2. The apparatus of claim 1, wherein the data packet structure further includes a transaction value for the transfer of the image product.

3. The apparatus of claim 1, wherein the data packet structure further includes a sub-attribute type that defines a type of the image product.

4. The apparatus of claim 3, wherein the type of the image product can be a file format type or a physical print type.

5. The apparatus of claim 3, wherein the data packet structure further includes a hash value of the sub-attribute type.

6. The apparatus of claim 1, wherein the transferor identification and the transferee identification are encrypted.

7. The apparatus of claim 6, wherein, when a user opens the image product, the user is directed to website where the user uses a private key to decrypt the transferor identification or the transferee identification.

8. The apparatus of claim 1, wherein an additional data packet structure is written to a node of the transaction processing network for each subsequent resale of the image product, wherein subsequent transferor identification and subsequent transferee identification are included in the additional data packet structure.

9. The apparatus of claim 1, wherein the transaction processing network is a blockchain ledger.

10. The apparatus of claim 1, wherein the cryptographic hash is watermarked.

11. A method of manufacturing an image product from a base work comprising:
- assigning image metadata to a master image file including an image from the base work, the image metadata including an identification of the base work and provenance of the base work;
- detecting objects in the image;
- recognizing the objects;
- assigning object metadata, including recognition of the object, to the master image file;
- generating a cryptographic hash of, altogether, the image, the image metadata, and the object metadata;
- generating an image product from the master image file for transfer; and
- writing a data packet structure to a node of a transaction processing network, wherein the data packet structure includes the cryptographic hash, and a transferor identification and a transferee identification for a transfer of the image product.

12. The method of claim 11, wherein the data packet structure further includes a transaction value for the transfer of the image product.

13. The method of claim 11, wherein the data packet structure further includes a sub-attribute type that defines a type of the image product.

14. The method of claim 13, wherein the type of the image product can be a file format type or a physical print type.

15. The method of claim 13, wherein the data packet structure further includes a hash value of the sub-attribute type.

16. The method of claim 11, wherein the transferor identification and the transferee identification are encrypted.

17. The method of claim 16, wherein, when a user opens the image product, the user is directed to website where the user uses a private key to decrypt the transferor identification or the transferee identification.

18. The method of claim 11, wherein an additional data packet structure is written to a node of the transaction processing network for each subsequent resale of the image product, wherein subsequent transferor identification and subsequent transferee identification are included in the additional data packet structure.

19. The method of claim 11, wherein the transaction processing network is a blockchain ledger.

20. The method of claim 11, wherein the cryptographic hash is watermarked.

* * * * *